United States Patent
Nakagawa et al.

(10) Patent No.: US 7,232,613 B2
(45) Date of Patent: Jun. 19, 2007

(54) BASE MATERIAL FOR PRESSURE-SENSITIVE ADHESIVE TAPE OR SHEET, PRESSURE-SENSITIVE TAPE OR SHEET USING THE BASE MATERIAL, AND PROCESS OF PRODUCING THE BASE MATERIAL

(75) Inventors: Yoshio Nakagawa, Ibaraki (JP); Masato Shirai, Ibaraki (JP); Shuzo Fujiwara, Ibaraki (JP); Yoshihide Kawaguchi, Ibaraki (JP); Hiroichi Ukei, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/873,141

(22) Filed: Jun. 23, 2004

(65) Prior Publication Data

US 2005/0006818 A1    Jan. 13, 2005

(30) Foreign Application Priority Data

Jun. 26, 2003    (JP)    ............ P. 2003-182353

(51) Int. Cl.
*B23B 27/32*    (2006.01)
*B29C 59/04*    (2006.01)

(52) U.S. Cl. ............ 428/523; 264/175; 524/405; 524/414; 524/425; 524/433; 524/445; 525/220; 525/221; 525/222

(58) Field of Classification Search ............ 528/502 R; 428/523; 264/175; 524/405, 414, 425, 433, 524/445; 525/220, 221, 222
See application file for complete search history.

(56) References Cited

U.S. PATENT DOCUMENTS 2,631,954 A * 3/1953 Bright ............ 428/343
4,038,012 A   7/1977 Sander
5,063,005 A   11/1991 Doheny, Jr.
5,439,628 A * 8/1995 Huang ............ 264/175
6,150,017 A * 11/2000 Burmeister et al. ..... 428/355 R
6,586,090 B2  7/2003 Nakagawa et al.

FOREIGN PATENT DOCUMENTS

| DE | 30 15 465 A1 | 10/1981 |
|---|---|---|
| EP | 1 097 976 A2 | 5/2001 |
| JP | 5-47249 A | 2/1993 |
| JP | 5-194915 A | 8/1993 |
| JP | 06-77946 | 10/1994 |
| JP | 2000-212347 | 8/2000 |
| JP | 2001-192629 A | 7/2001 |
| JP | 2001-311061 A | 11/2001 |

OTHER PUBLICATIONS

Patent Abstracts of Japan (2001)—JP 2000 212347 A.
European Search Report dated Oct. 12, 2004.

* cited by examiner

*Primary Examiner*—Fred Teskin
(74) *Attorney, Agent, or Firm*—Sughrue Mion, PLLC

(57) ABSTRACT

The base material for pressure-sensitive adhesive tape or sheet is constituted of a polyolefin based resin as the major component and is obtained by rolling by means of a calender having a measure capable of individually changing the rotational speed of each calender roll. Examples of the measure capable of individually changing the rotational speed of each calender roll include a measure provided with motors capable of individually driving their respective calender rolls and a measure provided with speed regulators capable of individually regulating their respective calender rolls. It may be employed that the number of calender rolls is four and that the roll arrangement is in the reverse L shape. It is preferable that the base material for pressure-sensitive adhesive tape or sheet contains an inorganic compound together with the polyolefin based resin.

12 Claims, 1 Drawing Sheet

BASE MATERIAL FOR PRESSURE-SENSITIVE ADHESIVE TAPE OR SHEET, PRESSURE-SENSITIVE TAPE OR SHEET USING THE BASE MATERIAL, AND PROCESS OF PRODUCING THE BASE MATERIAL

FIELD OF THE INVENTION

The present invention relates to a base material for pressure-sensitive adhesive tape or sheet, a pressure-sensitive adhesive tape or sheet using the base material and a process of producing the base material.

BACKGROUND OF THE INVENTION

A pressure-sensitive adhesive tape or sheet comprising a polyvinyl chloride based film as a base material (hereinafter sometimes referred to as "polyvinyl chloride pressure-sensitive adhesive tape") has been used in, for example, wire binding or electric insulation in household appliances or automobiles, or masking application at the time of painting. However, in recent years, from the viewpoint of an environmental issue, a trend of inhibiting the use of vinyl chloride is expanding in various fields, and as to the use of polyvinyl chloride pressure-sensitive adhesive tapes, the same tendency is observed.

In such a trend, various investigations have been made with respect to pressure-sensitive adhesive tapes free from polyvinyl chloride as a base material component. However, it is the present state that in the case of comparison with conventional polyvinyl chloride pressure-sensitive adhesive tapes, pressure-sensitive adhesive tapes having sufficient superiority are not developed yet from the viewpoints of performance and productivity.

On the other hand, as a substitute for polyvinyl chloride, various polyolefin based resins such as polyethylene, polypropylene, and olefin based elastomers are often used (see Patent Documents 1 to 4). Incidentally, these polyolefin based resins are formed into a film or sheet by extrusion molding or calender molding.

[Patent Document 1]
JP-A-2001-192629
[Patent Document 2]
JP-A-5-194915
[Patent Document 3]
JP-A-5-47249
[Patent Document 4]
JP-A-2001-311061

(The term "JP-A" as used herein means an "unexamined published Japanese patent application")

Hitherto, the production of a polyvinyl chloride film or sheet as a base material of polyvinyl chloride pressure-sensitive adhesive tape was carried out by the rolling system using calender rolls. In this case, in calender rolling, a system in which four calender rolls arranged in the reverse L shape are driven by one motor (single drive system) was generally employed. However, in the case of forming a resin composition containing a polyolefin based resin as the major component (polyolefin based resin composition) into a film by the single drive system that has hitherto been employed for the production of a polyvinyl chloride film or sheet, excessive loading of a motor occurs between the respective rolls (calender rolls), it is difficult to perform rolling at a high speed, and hence, it is difficult to design an enhancement of the productivity. Also, a scattering in characteristics or physical properties of the resulting base material for pressure-sensitive adhesive tape or sheet (or pressure-sensitive adhesive tape or sheet) is large. For example, if a scattering in characteristic regarding stress-strain is large, tearability of the pressure-sensitive adhesive tape lowers, or cutting in winding the pressure-sensitive adhesive tape becomes difficult, resulting in a lowering of the winding workability.

SUMMARY OF THE INVENTION

Accordingly, an object of the invention is to provide a base material for pressure-sensitive adhesive tape or sheet that even when a polyolefin based resin is used, is prepared with excellent productivity and reduced in a scattering of physical properties, a pressure-sensitive adhesive tape or sheet using the base material, and a process of producing the base material.

For the sake of achieving the foregoing object, the present inventors made extensive and intensive investigations. As a result, it has been found that in the calender rolling system, by employing a calender having a measure capable of individually changing the rotational speed of each calender roll, an adequate speed reduction ratio is obtained; that even when a polyolefin based resin is used, it is possible to perform high-speed rolling so that the productivity can be enhanced; and that a scattering of physical properties can be reduced, thereby obtaining the desired physical properties, leading to accomplishment of the invention.

Specifically, the invention provides a base material for pressure-sensitive adhesive tape or sheet, which is constituted of a polyolefin based resin as the major component and which is obtained by rolling by means of a calender having a measure capable of individually changing the rotational speed of each calender roll.

In the invention, the measure capable of individually changing the rotational speed of each calender roll is suitably a measure provided with motors capable of individually driving their respective calender rolls, or a measure provided with speed regulators capable of individually regulating their respective calender rolls. Also, it is preferable that the number of calender rolls is four, the roll arrangement being in the reverse L shape.

Also, it is preferable that the base material for pressure-sensitive adhesive tape or sheet contains an inorganic compound together with the polyolefin based resin.

Also, the invention provides a pressure-sensitive adhesive tape or sheet comprising a pressure-sensitive adhesive layer formed on at least one surface of the foregoing base material for pressure-sensitive adhesive tape or sheet.

Further, the invention provides a process of producing a base material for pressure-sensitive adhesive tape or sheet, comprising forming a base material for pressure-sensitive adhesive tape or sheet constituted of a polyolefin based resin as the major component by a calender having a measure capable of individually changing the rotational speed of each calender roll.

DESCRIPTION OF REFERENCE NUMERALS AND SIGNS

Figure 1:
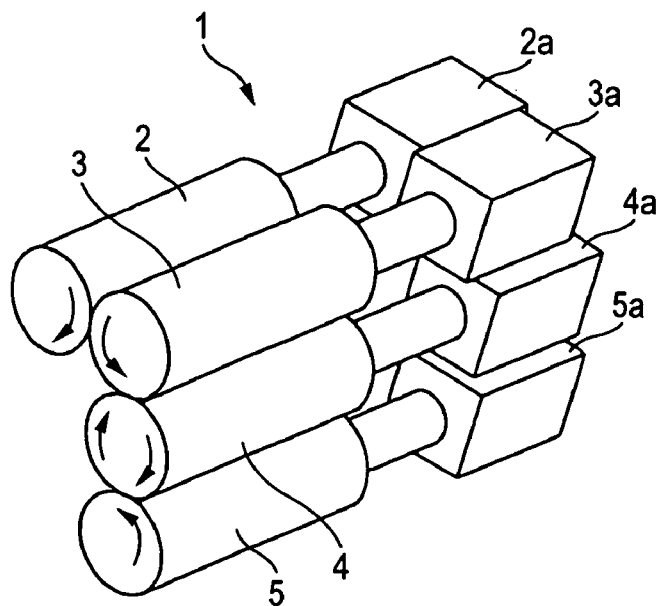
FIG. 1 is a schematic view partially showing one embodiment of a calender device that can be used in forming a pressure-sensitive adhesive tape base material of the invention by rolling.

1: The principal part including calender rolls of a "calender device having a measure capable of individually changing the rotational speed of each calender roll" and motors thereof 2: First calender roll 2a: Motor for driving the first calender roll 2

2b: Speed regulator capable of arbitrarily setting up the rotational speed of a first calender roll 2

3: Second calender roll

3a: Motor for driving the second calender roll 3

3b: Speed regulator capable of arbitrarily setting up the rotational speed of a second calender roll 3

4: Third calender roll

4a: Motor for driving the third calender roll 4

4b: Speed regulator capable of arbitrarily setting up the rotational speed of a third calender roll 4

5: Fourth calender roll

5a: Motor for driving the fourth calender roll 5

5b: Speed regulator capable of arbitrarily setting up the rotational speed of a fourth calender roll 5

DETAILED DESCRIPTION OF THE INVENTION

The mode for carrying out the invention will be described below in detail while referring to the accompanying drawings as the need arises. Incidentally, the same members or portions may be designated with the same symbols.

It is important that the base material for pressure-sensitive adhesive tape or sheet of the invention (hereinafter sometimes referred to as "pressure-sensitive adhesive tape base material") is constituted of a polyolefin based resin as the major component and is obtained by rolling (formation into a film) by means of a calender having a measure capable of individually changing the rotational speed of each calender roll. Since an olefin based resin is used, the environmental issue caused due to the polyvinyl chloride based resin is prevented from the generation. Also, since the base material for pressure-sensitive adhesive tape or sheet is formed by rolling by a calender having a measure capable of individually changing the rotational speed of each calender roll, it is possible from the process standpoint to perform rolling at a high speed in the state where an adequate speed reduction ratio is kept so that the productivity can be enhanced. Moreover, from the characteristic standpoint of the pressure-sensitive adhesive tape base material (or pressure-sensitive adhesive tape or sheet), a scattering of physical properties can be reduced, thereby revealing an effect for obtaining the desired characteristics.

(Calender)

The foregoing "calender having a measure capable of individually changing the rotational speed of each calender roll" means a calender having a function (measure) in which each of plural calender rolls constituting the calender (hereinafter sometimes simply referred to "roll") individually changes its rotational speed. Concretely, for example, in the case the calender is constituted of four rolls, it is meant that the calender has a measure in which each of the four rolls can individually change its rotational speed. That is, it is meant that the calender has a function (measure) in which the rotational speed of each of the rolls can be independently set up (controlled) without being influenced by the rotational speed of the adjacent roll.

Figure 2:
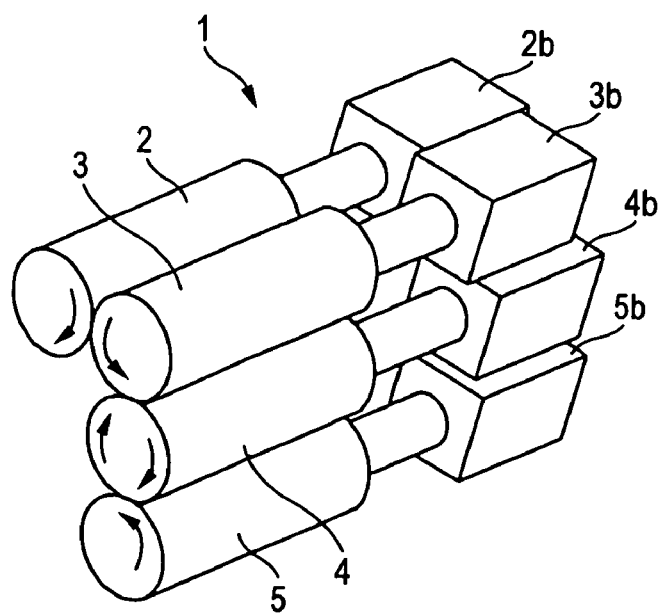
FIG. 2 is a schematic view partially showing another embodiment of a calender device that can be used in forming a pressure-sensitive adhesive tape base material of the invention by rolling.

The "calender having a measure capable of individually changing the rotational speed of each calender roll" is not particularly limited so far as it has such a function that each of plural calender rolls constituting the calender individually changes its rotational speed, but examples thereof include calenders shown in FIGS. 1 to 2.

FIG. 1 is a schematic view partially showing one embodiment of a calender device that can be used in forming a pressure-sensitive adhesive tape base material of the invention by rolling. In FIG. 1, 1 denotes the principal part including calender rolls of a "calender device having a measure capable of individually changing the rotational speed of each calender roll" and motors thereof; 2 denotes a first calender roll; 2a denotes a motor for driving the first calender roll 2; 3 denotes a second calender roll; 3a denotes a motor for driving the second calender roll 3; 4 denotes a third calender roll; 4a denotes a motor for driving the third calender roll 4; 5 denotes a fourth calender roll; and 5a denotes a motor for driving the fourth calender roll 5. The calender device shown in FIG. 1 is a calender device having a measure capable of individually changing the rotational speed of each calender roll, and the first calender roll 2 to the fourth calender roll 5 have the motors 2a to 5a, respectively and can be actuated by independent drive. That is, in the calender device shown in FIG. 1, each of the four calender rolls is provided with a motor capable of individually driving the calender roll, and by controlling the number of revolution of each motor, it is possible to individually change the rotational speed of each of the calender rolls.

With respect to a concrete constitution of the calender device shown in FIG. 1, the number of calender rolls is four in total of the first calender roll 2, the second calender roll 3, the third calender roll 4, and the fourth calender roll 5. Also, the roll arrangement is in the reverse L shape. That is, the calender device shown in FIG. 1 has the shape wherein the four calender rolls are arranged in the reverse L shape (so-called "reverse L four-roll arrangement" shape).

FIG. 2 is a schematic view partially showing another embodiment of a calender device that can be used in forming a pressure-sensitive adhesive tape base material of the invention by rolling. In FIG. 2, 2b denotes a speed regulator capable of arbitrarily setting up (controlling) the rotational speed of a first calender roll 2; 3b denotes a speed regulator capable of arbitrarily setting up (controlling) the rotational speed of a second calender roll 3; 4b denotes a speed regulator capable of arbitrarily setting up (controlling) the rotational speed of a third calender roll 4; and 5b denotes a speed regulator capable of arbitrarily setting up (controlling) the rotational speed of a fourth calender roll 5. Incidentally, the numerals 1, 2, 3, 4 and 5 are the same as those described above. The calender device shown in FIG. 2 is a calender device having a measure capable of individually changing the rotational speed of each calender roll, the first calender roll 2 to the fourth calender roll 5 have the speed regulators 2b to 5b, respectively, and the rotational speed of each of the calender rolls can be arbitrarily set up (controlled) by means of a driving force of a motor (not shown) via the speed regulator provided in each of the calender rolls. That is, in the calender device shown in FIG. 2, each of the four calender rolls is provided with a speed regulator capable of individually controlling the calender roll, and by controlling a driving force from a motor (not shown) via the speed regulator, it is possible to individually change the rotational speed of each of the calender rolls. Incidentally, in the embodiment shown in FIG. 2, the motor for driving the calender roll is not illustrated, but the motor may be single or may be provided in every calender roll.

The calender device shown in FIG. 2 has the same shape (reverse L four-roll arrangement shape) as in the calender device shown in FIG. 1.

As the "calender having a measure capable of individually changing the rotational speed of each calender roll", a "measure provided with motors capable of individually driving their respective calender rolls" and a "measure provided with speed regulators capable of individually regulating their respective calender rolls" can be employed.

Incidentally, the calender devices having the reverse L four-roll arrangement shape as shown in FIGS. 1 and 2 have a constitution in which rolling is first carried out by the first calender roll 2 and the second calender roll 3, then carried out by the second calender roll 3 and the third calender roll 4, and finally carried out by the third calender roll 4 and the fourth calender roll 5. By this rolling, it is possible to prepare a pressure-sensitive adhesive tape base material formed into a film or sheet shape.

In the "calender device having a measure capable of individually changing the rotational speed of each calender roll" that can be used in forming the pressure-sensitive adhesive tape base material of the invention, with respect to the calender rolls, the material quality, the number, and the roll arrangement are not particularly limited. With respect to the material quality of the calender rolls, for example, alloy forged steel can be used. In particular, hot polished forged steel can be suitably used in view of surface precision. Incidentally, the respective calender rolls may be made of the same material quality or a different material quality.

The number of calender rolls is generally three or more. The number of calender rolls is suitable three, four, five or six, and especially preferably four.

The roll arrangement of calender rolls is not particularly limited, but examples thereof include the Z shape, the L shape, and the reverse L shape, with the reverse L shape being preferable.

Accordingly, with respect to the calender shape, the reverse L four-roll arrangement shape shown in FIGS. 1 and 2 is optimum.

Also, in the case where a motor or speed regulator is provided in the calender roll, the motor or speed regulator is not particularly limited with respect to the kind and so on but can be properly chosen depending upon the equipment specification.

Also, the rotational speed of each calender roll is not particularly limited. For example, in the case where the calender rolls are arranged in the reverse L four-roll arrangement shape as shown in FIG. 1 or 2, the rotational speed of the first calender roll, the second calender roll, the third calender roll, and the fourth calender roll can be set up at from 14 to 27 m/min, from 18 to 35 m/min, from 23 to 46 m/min, and from 30 to 60 m/min, respectively. As a matter of course, the calender rolls are arranged in the order of the first calender roll, the second calender roll, the third calender roll, and the fourth calender roll in the flow direction in rolling. In this way, it is preferable that the rotational speed of the calender rolls is controlled such that it gradually increases in the flow direction in rolling.

Incidentally, the foregoing rotational speed of the calender rolls is corresponding to a length of the film or sheet that is obtained by rolling by means of the rotation of two calender rolls having the same rotational speed (or number of revolution) and comes out.

Also, in order to obtain an adequate speed reduction ratio, the speed (speed ratio) between the respective calender rolls (between the calender rolls adjacent to each other) is, for example, chosen within the range of from about 1.1 to 1.6 times, preferably from about 1.2 to 1.5 times, and especially preferably about 1.3 times in terms of (rotational speed of calender roll in high speed side)/(rotational speed of calender roll in low speed side) from the viewpoint of performing rolling well. When the speed ratio between the calender rolls falls within the foregoing range, an effect for enhancing the productivity can be obtained at excellent levels.

(Resin Composition Constituting Pressure-sensitive Adhesive Tape Base Material)

As described previously, the pressure-sensitive adhesive tape base material is constituted of a polyolefin based resin as the major component. That is, the pressure-sensitive adhesive tape base material can be formed of a resin composition containing a polyolefin based resin as the major component (polyolefin based resin composition). It is important that the proportion of the polyolefin based resin is 50% by weight or more based on the whole amount of the resin components because it is used as the major component. As the polyolefin based resin as the major component of the constitutional components (resin components) in the pressure-sensitive adhesive tape base material, resins having a relatively high melting point such as polypropylene; and resins having a relatively low melting point such as high-density polyethylene, low-density polyethylene, linear low-density polyethylene, ultralow-density polyethylene, medium-density polyethylene, ethylene-propylene copolymers, copolymers of ethylene and other α-olefin, ethylene-vinyl acetate copolymers, and ethylene-(meth)acrylate copolymers (for example, ethylene-ethyl acrylate copolymers) can be used. The polyolefin based resin can be used singly or in combination of two or more thereof.

So far as the polyolefin based resin is the major component of the constitutional components (resin components) in the pressure-sensitive adhesive tape base material, it can be used together with other resin.

Above all, a resin composition comprising a polymer alloy containing an ethylene component and a propylene component, having compounded therein a thermoplastic resin having a carbonylic oxygen atom in the molecular skeleton thereof can be suitably used as the resin composition constituting the pressure-sensitive adhesive tape base material. When the pressure-sensitive adhesive tape base material is constituted of such a resin composition, not only the workability in winding the pressure-sensitive adhesive tape (for example, flexibility and follow-up properties) can be largely enhanced, but also the fluidity of the resin composition at the time of rolling can be improved. Thus, it is possible to produce a pressure-sensitive adhesive tape base material with more excellent productivity. Also, since such a resin composition can reveal stable productivity, a scattering in physical properties is still more reduced so that a pressure-sensitive adhesive tape base material having an excellent quality can be produced.

Examples of the foregoing polymer alloys containing an ethylene component and a propylene component include mixtures (physical mixtures) of polypropylene (for example, homopolypropylene and random polypropylene) and polyethylene (including copolymers of ethylene and a small amount of other α-olefin), propylene/ethylene copolymers, and terpolymers of propylene, ethylene and other α-olefin (examples of other α-olefin include 1-butene, 1-pentene, 1-hexene, 4-methyl-1-pentene, 1-heptene, and 1-octene, with 1-butene being preferable). Incidentally, the "homopolypropylene" as referred to herein means a polymer substantially made of only (consisting of 100% by weight of) propylene (a homopolymer of propylene) as the monomer component; and the "random polypropylene" as referred to herein means a polypropylene based random copolymer in which propylene is random copolymerized with an ethylene component in an amount of several % by weight based on the whole of the monomer components. Of these, in the case of the invention, the polymer alloy containing an ethylene component and a propylene component is especially preferably a propylene/ethylene based copolymer resulting from two-stage or multi-stage polymerization. As such a propylene/ethylene based copolymer resulting from multi-stage polymerization, for example, a trade name "Catalloy Q-100F", a trade name "Catalloy Q-200F", a trade name "Catalloy C200F", and a trade name "Catalloy KS-353P" (all manufactured by Sun Allomer Ltd.) are commercially available.

Incidentally, as the copolymerization method by multi-stage polymerization, for example, methods described in JP-A-2001-192629 and JP-A-2001-311061 can be employed. For example, there is employed a method in which propylene and optionally, other α-olefin are subjected to preliminary polymerization of the first stage of the multi-stage polymerization in the presence of a catalyst made of a titanium compound and an organoaluminum compound, to prepare polypropylene (a homopolymer of propylene) or a propylene-α-olefin copolymer (a copolymer of propylene and other (α-olefin); and in the second stage or subsequent stages, propylene, ethylene and optionally, other α-olefin are copolymerized in the presence of the resin composition obtained by the preliminary polymerization of the first stage. In this way, a polymer alloy in which the polymer (polypropylene or propylene-α-olefin copolymer) formed by the preliminary polymerization of the first stage and the polymer (propylene-ethylene copolymer or propylene-ethylene-other α-olefin copolymer) formed by the copolymerization of the second stage or subsequent stages are blended at the molecular level in the polymerization step of the second stage or subsequent stages is obtained.

Examples of the titanium compound include spherical solid catalysts having a mean particle size of 15 μm, which are obtained by, for example, copulverizing titanium trichloride and magnesium chloride and treating with n-butyl orthotitanate, 2-ethylhexanol, ethyl p-toluylate, silicon tetrachloride, diisobutyl phthalate, etc. Also, as the organoaluminum compound, alkylaluminum based compounds such as triethylaluminum can be used. Further, in the polymerization layer, silicon based compounds such as diphenyldimethoxysilane, or iodine based compounds such as ethyl iodide can be added as an electron donor.

Also, as the thermoplastic resin having a carbonylic oxygen atom (an oxygen atom assigned to a carbonyl group) in the molecular skeleton thereof, soft polyolefin based resins having a carbonylic oxygen atom in the molecular skeleton thereof (hereinafter sometimes referred to as "carbonyl group-containing polyolefin based resin") can be suitably used. Examples of the carbonyl group-containing polyolefin based resin include ethylene based copolymers having a carbonyl group, which are obtained by using ethylene, a vinyl ester-based compound and/or an α,β-unsaturated carboxylic acid or its derivative (for example, anhydrides, esters, and chlorides) as monomer components, or metal salts thereof (ionomers). These compounds generally have a melting point of not higher than 120° C., and preferably from 40 to 100° C. The melting point can be measured by a differential scanning colorimeter (DSC) in accordance with JIS K 7121.

Examples of the vinyl ester-based compound include esters of vinyl alcohol and a lower carboxylic acid (for example, vinyl esters of a lower carboxylic acid) such as vinyl acetate. Examples of the α,β-unsaturated carboxylic acid include (meth)acrylic acid, maleic acid, fumaric acid, and itaconic acid. With respect to the derivative of an α,β-unsaturated carboxylic acid, examples of α,β-unsaturated carboxylic acid anhydrides include maleic anhydride and itaconic anhydride. Examples of α,β-unsaturated carboxylic esters include (meth)acrylates [for example, alkyl (meth)acrylates such as methyl (meth)acrylate, ethyl (meth) acrylate, propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, nonyl (meth) acrylate, decyl (meth)acrylate, lauryl (meth)acrylate, and stearyl (meth)acrylate; cycloalkyl (meth)acrylates such as cyclohexyl (meth)acrylate; and functional group-containing (meth)acrylates such as glycidyl (meth)acrylate and 2-hydroxyethyl (meth)acrylate]; maleates [for example, (mono- or di-)alkyl maleates such as monomethyl maleate, monoethyl maleate, and diethyl maleate]; and fumarates [for example, (mono- or di-)alkyl fumarates such as monomethyl fumarate and monoethyl fumarate]. As the vinyl ester based compound and/or the α,β-unsaturated carboxylic acid or its derivative, vinyl acetate, (meth)acrylic acid, and (meth) acrylates are preferable; and as the (meth)acrylate, alkyl (meth)acrylates [especially, ethyl (meth)acrylate] are suitable. The vinyl ester based compound and/or the α,β-unsaturated carboxylic acid or its derivative can be used singly or in combination of two or more thereof.

Specific examples of the carbonyl group-containing ethylene based copolymer or its metal salt (ionomer) that is suitably used include an ethylene-acrylic acid copolymer, an ethylene-methacrylic acid copolymer, an ethylene-ethyl acrylate copolymer, an ethylene-acrylic acid-ethyl acrylate copolymer, an ethylene-vinyl acetate copolymer, an ethylene-vinyl acetate-ethyl acrylate copolymer, an ethylene-glycidyl methacrylate copolymer, an ethylene-glycidyl methacrylate-ethyl acrylate copolymer, and metal salts thereof (ionomers). The carbonyl group-containing ethylene based copolymer or its metal salt (ionomer) can be used singly or in combination of two or more thereof.

In the resin composition containing a polymer alloy containing an ethylene component and a propylene component and a thermoplastic resin having a carbonylic oxygen atom in the molecular skeleton thereof, as a resin composition constituting a pressure-sensitive adhesive tape base material, a proportion of the polymer alloy containing an ethylene component and a propylene component to the thermoplastic resin having a carbonylic oxygen atom in the molecular skeleton thereof (especially, a carbonyl group-containing ethylene based copolymer or a metal salt thereof) can be, for example, chosen within the range of from about 9/1 to 2/8 (preferably from 8/2 to 4/6) by weight.

The resin composition constituting the pressure-sensitive adhesive tape base material may contain an inorganic compound. In the invention, when the pressure-sensitive adhesive tape base material is constituted of a resin composition containing an inorganic compound together with the polyolefin based resin, by obtaining the pressure-sensitive adhesive tape base material by rolling by means of the foregoing "calender having a measure capable of individually changing the rotational speed of each calender roll", the foregoing effect is especially remarkably exhibited, whereby the effect can be explicitly confirmed.

Examples of the inorganic compound include clay minerals such as clay; metal hydroxides such as aluminum hydroxide, magnesium hydroxide, zirconium hydroxide, calcium hydroxide, and barium hydroxide; metal carbonates such as basic magnesium carbonate, magnesium-calcium carbonate, calcium carbonate, barium carbonate, and dolomite; metal hydrates (hydrates of metallic compounds) such as hydrotalcite and borax; barium metaborate; magnesium oxide; and red phosphorus. The inorganic compound can be used singly or in admixture of two or more thereof. Of these, metal hydroxides (such as aluminum hydroxide, magnesium hydroxide, zirconium hydroxide, calcium hydroxide, and barium hydroxide), basic magnesium carbonate, and hydrotalcite are excellent in an effect for imparting flame retardance and economically advantageous.

The resin composition constituting the pressure-sensitive adhesive tape base material may be compounded with various additives such as fillers, pigments, lubricants, ultraviolet light absorbers, and antioxidants other than the foregoing inorganic compound.

(Production Method)

Incidentally, in the production method of the pressure-sensitive adhesive tape base material (base material for pressure-sensitive adhesive tape or sheet) of the invention, it is possible to produce a pressure-sensitive adhesive tape base material constituted of a polyolefin based resin as the major component by the "calender having a measure capable of individually changing the rotational speed of each calender roll". Concretely, for example, a polyolefin based resin and optionally, other component are mixed or kneaded (for example, by melt kneading) to prepare a resin composition (base material constitutional material), and the base material constitutional material is then introduced into a calender device having a measure capable of individually changing the rotational speed of each calender roll, whereby a pressure-sensitive adhesive tape base material formed in the film or sheet shape can be prepared. In mixing or kneading, for example, a mixing machine (for example, a pressure kneader) can be used. Also, after mixing, in introducing the base material constitutional material into the calender device having a measure capable of individually changing the rotational speed of each calender roll, the introduction can be performed via a two-roll mixing roll or a strainer extruder. Incidentally, after preparing the pressure-sensitive adhesive tape base material formed in the film or sheet shape by the calender device having a measure capable of individually changing the rotational speed of each calender roll, the film or sheet can be cooled and provided for a winding step as the need arises.

In the calender device having a measure capable of individually changing the rotational speed of each calender roll, it is desired that the line speed is, for example, 30 m/min or more (preferably 50 m/min or more), and especially, it is optimum that the line speed is about 60 m/min (for example, from 55 to 65 m/min). Incidentally, the upper limit of the line speed is preferably about 80 m/min. When the line speed in the calender device having a measure capable of individually changing the rotational speed of each calender roll is high (for example, from 30 to 80 m/min), the shape of the surface of the resulting tape or sheet can be made good, and such largely contributes to an enhancement of the productivity. Incidentally, in the case where the calender device is a reverse L four-roll calender device as shown in FIG. 1 or 2, the line speed as referred to herein is equal (corresponding) to the rotational speed of the fourth calender roll 5. That is, the line speed in the calender device is equal (corresponding) to the rotational speed of the final calender roll in the flow direction in rolling.

The thickness of the pressure-sensitive adhesive tape base material is not particularly limited but is, for example, from about 10 to 500 μm (preferably from 12 to 200 μm, and more preferably from 50 to 180 μm). Incidentally, the pressure-sensitive adhesive tape base material may be in the form of either a single layer or multiple layers. If desired, the pressure-sensitive adhesive tape base material may be subjected to various treatments such as backside treatment, antistatic treatment, and undercoating treatment.

(Pressure-sensitive Adhesive Tape or Sheet)

As described previously, the pressure-sensitive adhesive tape or sheet of the invention is constituted of a base material for pressure-sensitive adhesive tape or sheet, which is constituted of a polyolefin based resin as the major component and which is obtained by rolling by means of a calender having a measure capable of individually changing the rotational speed of each calender roll, and a pressure-sensitive adhesive layer formed on at least one surface of the base material.

As a pressure-sensitive adhesive for forming the pressure-sensitive adhesive layer, known or customary pressure-sensitive adhesives such as acrylic pressure-sensitive adhesives, rubber based pressure-sensitive adhesives (for example, natural rubber based pressure-sensitive adhesives and synthetic rubber based pressure-sensitive adhesives), silicone based pressure-sensitive adhesives, and urethane based pressure-sensitive adhesives can be properly chosen and used. The pressure-sensitive adhesive can be used singly or in combination of two or more thereof. The pressure-sensitive adhesive layer may be in the form of either a single layer or a laminate. Incidentally, in the case where the pressure-sensitive adhesive layer is formed on the both surfaces of the pressure-sensitive adhesive tape base material, the pressure-sensitive adhesives constituting the two pressure-sensitive adhesive layers may be either a pressure-sensitive adhesive of the same kind or formulation or a pressure-sensitive adhesive of a different kind or formulation. The pressure-sensitive adhesive may be compounded with various known additives such as plasticizers, coloring agents, antistatic agents, blowing agents, and surfactants as the need arises.

The thickness of the pressure-sensitive adhesive layer is, for example, from about 5 to 100 μm (preferably from 10 to 50 μm).

The pressure-sensitive adhesive layer can be formed by a known or customary method. Examples of the method of forming a pressure-sensitive adhesive layer include a method in which a solution or emulsion of a pressure-sensitive adhesive in a solvent, etc. is coated on the surface (one surface or both surfaces) of the pressure-sensitive adhesive tape base material; and a method in which a hot melt type pressure-sensitive adhesive is melt extruded and coated or laminated on the pressure-sensitive adhesive tape base material. Incidentally, after the pressure-sensitive adhesive tape base material is obtained by rolling by means of the calender device having a measure capable of individually changing the rotational speed of each calender roll, the pressure-sensitive adhesive may be continuously coated to form a pressure-sensitive adhesive layer. The step of forming the pressure-sensitive adhesive tape base material and the step of coating the pressure-sensitive adhesive may be carried out in a separate step from each other.

Incidentally, the pressure-sensitive adhesive layer may be protected by a release film (release liner). Also, so far as the effect of the invention is not hindered, the pressure-sensitive adhesive tape or sheet may have other layer (for example, an interlayer and an undercoating layer).

For example, when the pressure-sensitive adhesive tape or sheet is constituted of a pressure-sensitive adhesive tape base material, a pressure-sensitive adhesive layer formed on one surface of the pressure-sensitive adhesive tape base material, and a backside treatment layer formed on the other surface of the pressure-sensitive adhesive tape base material, the surface of the pressure-sensitive adhesive layer is superimposed and laminated on the back surface of the sheet (surface of the backside treatment layer), whereby the pressure-sensitive adhesive layer can be protected. Also, in this case, by winding in the rolled shape, a pressure-sensitive adhesive tape in the roll-like wound state or shape (roll-like wound pressure-sensitive adhesive tape) can be prepared, and in the case of winding not in the rolled shape, a pressure-sensitive adhesive sheet can be prepared.

According to the base material for pressure-sensitive adhesive tape or sheet of the invention, even when the polyolefin based resin is used as the major component of the base material, the base material for pressure-sensitive adhesive tape or sheet can be prepared with excellent productivity, and a scattering in physical properties is reduced. Accordingly, the pressure-sensitive adhesive tape or sheet using this base material for pressure-sensitive adhesive tape or sheet can be supplied as a substitute that can be sufficiently used as a pressure-sensitive adhesive tape made of a polyvinyl chloride based film (polyvinyl chloride pressure-sensitive adhesive tape), which has hitherto been used as an insulating tape of electrical apparatus in various fields such as vehicles (for example, automobiles, electric trains, and buses), airplanes, ships, houses, and factories.

The invention will be described below in detail with reference to the following Examples, but it should not be construed that the invention is limited thereto.

As materials to be used, the following materials were used.

[Resin Component]

(1) Ethylene-vinyl acetate copolymer (EVA) (a trade name: Evaflex P-1905, manufactured by Du Pont-Mitsui Polychemicals Co., Ltd., melting point: 84° C., hereinafter sometimes referred to as "A1")

(2) Ethylene-vinyl acetate copolymer (EVA) (a trade name: Ultrathene 635, manufactured by Tosoh Corporation, melting point: 79° C., hereinafter sometimes referred to as "A2")

(3) Linear low-density polyethylene (LLDPE) (a trade name: Ultzex 3021F, manufactured by Mitsui Chemicals, Inc., melting point: 110° C., hereinafter sometimes referred to as "A3")

(4) A trade name: Catalloy Q-100F (manufactured by Sun Allomer Ltd., hereinafter sometimes referred to as "A4")

(5) A trade name: Catalloy Q-200F (manufactured by Sun Allomer Ltd., hereinafter sometimes referred to as "A5")

(6) A trade name: Catalloy C200F (manufactured by Sun Allomer Ltd., hereinafter sometimes referred to as "A6")

[Inorganic Compound]

(1) Calcined clay (treated by aminosilane coupling) (a trade name: Translink 445, manufactured by Engelhard Corporation, hereinafter sometimes referred to as "B1")

(2) Calcined clay (treated by aminosilane coupling) (a trade name: Translink 555, manufactured by Engelhard Corporation, hereinafter sometimes referred to as "B2")

(3) Magensium hydroxide ($Mg(OH)_2$, treated by aminosilane coupling) (a trade name: Kisuma 5NH, manufactured by Kyowa Chemical Industry Co., Ltd., hereinafter sometimes referred to as "B3")

[Other Additives]

(1) Phenol based antioxidant (a trade name: Adekastab AO-60, manufactured by Asahi Denka Co., Ltd., hereinafter sometimes referred to as "C1")

(2) Phosphorus based antioxidant (a trade name: Adekastab HP-10, manufactured by Asahi Denka Co., Ltd., hereinafter sometimes referred to as "C2")

EXAMPLE 1

A resin composition, an inorganic compound and other additives were dry blended in a proportion shown in Table 1, and the blend was then kneaded and melted by a pressure kneader (setting temperature: 175° C.) to prepare a resin composition. In Table 1, the addition amounts of resin component, inorganic compound and other additives are represented by "parts by weight" unit unless otherwise indicated. The resin composition was formed into a film having a thickness of 0.08 mm by a calender device having a measure capable of individually changing the rotational speed of each calender roll (a precision calender roll machine equipped with reverse L four rolls of φ8 inch×24 inch, manufactured by Hitachi, Ltd.). There was thus prepared a pressure-sensitive adhesive tape base material.

Incidentally, the foregoing calender device has a constitution shown in FIG. 1, in which each of the first calender roll to the fourth calender roll has a motor and can be actuated by independent drive. The rotational speed of the first calender roll, the second calender roll, the third calender roll, and the fourth calender roll was set up at 14 m/min, 18 m/min, 23 m/min and 30 m/min, respectively. Incidentally, since the line speed (rolling speed) of the calender device is equal to the rotational speed of the fourth calender roll (final calender roll in the flow direction of rolling), the line speed (rolling speed) of the calender device is 30 m/min or more.

Further, after subjecting one surface of the pressure-sensitive adhesive tape base material to corona discharge treatment, an acrylic pressure-sensitive adhesive was coated in a thickness after drying of 30 μm, followed by drying to prepare a pressure-sensitive adhesive tape.

EXAMPLES 2 TO 6

Pressure-sensitive adhesive tape base materials were prepared in the same manner as in Example 1, except for employing each of proportions of the resin component, the inorganic compound and other additives shown in Table 1. Further, pressure-sensitive adhesive tapes were prepared in the same manner as in Example 1, except for using each of the resulting pressure-sensitive adhesive tape base materials.

COMPARATIVE EXAMPLES 1 TO 4

Pressure-sensitive adhesive tape base materials were prepared in the same manner as in Example 1, except for employing each of proportions of the resin component, the inorganic compound and other additives shown in Table 1 and using a calender device having a reverse L four-roll shape with respect to calender rolls thereof and being actuated by single drive system (a calender device not having a measure capable of individually changing the rotational speed of each calender roll and driving each of the calender rolls at the same rotational speed). Further, pressure-sensitive adhesive tapes were prepared in the same manner as in Example 1, except for using each of the resulting pressure-sensitive adhesive tape base materials.

Incidentally, the calender device to be actuated by single drive system as used in the Comparative Examples is concretely a calender device of a system of driving the four rolls by one motor. Further, this calender device is a calender device of a system in which setting of the rotational speed of each calender roll relies only upon the motor, so that the rotational speed of each calender roll cannot be individually set up (controlled).

(Evaluation)

The pressure-sensitive adhesive tapes obtained in Examples 1 to 6 and Comparative Examples 1 to 4 were measured or evaluated in the following manners. Thus, the productivity of the pressure-sensitive adhesive tape base material and physical properties regarding stress-strain as physical properties of the pressure-sensitive adhesive tape were evaluated.

(Evaluation of Productivity of Pressure-sensitive Adhesive Tape Base Material)

In preparing a pressure-sensitive adhesive tape base material, the case where the line speed (rolling speed) of the calender device was 30 m/min or more, and rolling could be performed is designated as "○ (accepted)", and the case where the line speed was less than 30 m/min, or rolling could not be performed is designated as "X (not accepted)". The evaluation results are shown in the "Productivity" row in Table 1.

(Evaluation of Stress-strain Curve of Pressure-sensitive Adhesive Tape)

A specimen (width: 19 mm) taken from the pressure-sensitive adhesive tape was drawn in an atmosphere at 23° C. and at 60% RH using a universal tension and compression testing machine under conditions at a tensile speed of 300 mm/min and a distance between chucks of 50 mm and measured for breaking strength (N/19 mm) and breaking expansion (%). The case where the breaking strength fell within the range of from 25 N/19 mm to 35 N/19 mm is designated as "○ (accepted)", and the case where the breaking expansion fell within the range of 150% or more but less than 600% is designated as "○ (accepted)". Accordingly, the case where the breaking strength fell within the range of less than 25 N/19 mm or exceeding 35 N/19 mm is designated as "X (not accepted)", and the case where the breaking expansion fell within the range of less than 150% or 600% or more is designated as "X (not accepted)". The evaluation results are shown in the "Stress-strain physical properties" row in Table 1.

Incidentally, the judgment of this acceptance was made by confirming the matter that in view of the winding workability of an actual pressure-sensitive adhesive tape onto an adherend and the relationship between the breaking strength and the breaking expansion, if the breaking strength and the breaking expansion fall within the foregoing ranges, winding works of the pressure-sensitive adhesive tape can be carried out while easily drawing the pressure-sensitive adhesive tape (without causing breakage of the pressure-sensitive adhesive tape), and after winding, the pressure-sensitive adhesive tape can be easily cut by fingers.

That is, when the breaking strength is less than 25 N/19 mm, the pressure-sensitive adhesive tape is liable to cause breakage (cutting) during the winding works of the pressure-sensitive adhesive tape, and when it exceeds 35 N/19 mm, it becomes difficult to easily cut the pressure-sensitive adhesive tape by fingers after winding the pressure-sensitive adhesive tape. On the other hand, when the breaking expansion is less than 150%, the pressure-sensitive adhesive tape is hardly expanded so that the workability of winding the pressure-sensitive adhesive tape lowers, and when it is 600% or more, the pressure-sensitive adhesive tape is excessively expanded so that the workability of winding the pressure-sensitive adhesive tape lowers, and it becomes difficult to easily cut the pressure-sensitive adhesive tape by fingers after winding the pressure-sensitive adhesive tape.

TABLE 1

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| Resin component | | | | | | | | | | |
| A1 |  | 35 | 30 |  |  |  |  | 35 |  |  |
| A2 |  |  |  | 35 | 45 | 35 |  |  | 45 | 35 |
| A3 | 17 |  |  |  |  |  | 17 |  |  |  |
| A4 | 66 | 65 |  |  |  | 65 | 66 | 65 |  | 65 |
| A5 |  |  | 70 | 65 | 55 |  |  |  | 55 |  |
| A6 | 17 |  |  |  |  |  | 17 |  |  |  |
| Inorganic compound | | | | | | | | | | |
| B1 |  | 50 |  |  |  |  |  | 50 |  |  |
| B2 |  |  | 45 | 50 | 60 |  |  |  | 60 |  |
| B3 |  |  |  |  |  | 70 |  |  |  | 70 |
| Other additives | | | | | | | | | | |
| C1 | 0.2 | 0.5 | 0.5 | 0.5 | 0.5 | 0.5 | 0.2 | 0.5 | 0.5 | 0.5 |
| C2 | 0.2 | 0.2 | 0.2 | 0.2 | 0.2 | 0.2 | 0.2 | 0.2 | 0.2 | 0.2 |
| Productivity | ○ | ○ | ○ | ○ | ○ | ○ | X | X | X | X |
| Stress-strain physical properties | ○ | ○ | ○ | ○ | ○ | ○ | X | ○ | ○ | ○ |

As is clear from Table 1, in all of the pressure-sensitive adhesive tapes according to the invention, even when the pressure-sensitive adhesive tape base material is prepared using a polyolefin base resin, the productivity of the pressure-sensitive adhesive tape base material and the physical properties regarding stress-strain as physical properties as the pressure-sensitive adhesive tape are good.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive tape or sheet comprising a pressure-sensitive adhesive layer formed on at least one surface of a base material, which comprises a polyolefin based resin and at least one inorganic compound selected from the group consisting of clay materials, metal hydroxides, metal carbonates, metal hydrates, barium metaborate, magnesium oxide, and red phosphorus and which is obtained by rolling by means of a calender having a measure capable of individually changing the rotational speed of each calender roll.

2. A process of producing a base material for pressure-sensitive adhesive tape or sheet, comprising forming a base material for pressure-sensitive adhesive tape or sheet constituted of a resin composition comprising a polymer alloy containing an ethylene component and a propylene component, having compounded therein a thermoplastic resin having a carbonylic oxygen atom in the molecular skeleton thereof by a calender having a measure capable of individually changing the rotational speed of each calender roll.

3. The process of producing a base material for pressure-sensitive adhesive tape or sheet according to claim 2, wherein the measure capable of individually changing the rotational speed of each calender roll is a measure provided with motors capable of individually driving their respective calender rolls.

4. The process of producing a base material for pressure-sensitive adhesive tape or sheet according to claim 2, wherein the measure capable of individually changing the rotational speed of each calender roll is a measure provided with speed regulators capable of individually regulating their respective calender rolls.

5. The process of producing a base material for pressure-sensitive adhesive tape or sheet according to claim 2, wherein the number of calender rolls is four, and the roll arrangement is in a reverse L shape.

6. The process of producing a base material for pressure-sensitive adhesive tape or sheet according to claim 2, wherein the base material for pressure-sensitive adhesive tape or sheet comprises an inorganic compound together with the polyolefin based resin.

7. A base material for pressure-sensitive adhesive tape or sheet, which is constituted of a resin composition comprising a polymer alloy containing an ethylene component and a propylene component, having compounded therein a thermoplastic resin having a carbonylic oxygen atom in the molecular skeleton thereof and which is obtained by rolling by means of a calender having a measure capable of individually changing the rotational speed of each calender roll.

8. The base material for pressure-sensitive adhesive tape or sheet according to claim 7, wherein the measure capable of individually changing the rotational speed of each calender roll is a measure provided with motors capable of individually driving their respective calender rolls.

9. The base material for pressure-sensitive adhesive tape or sheet according to claim 7, wherein the measure capable of individually changing the rotational speed of each calender roll is a measure provided with speed regulators capable of individually regulating their respective calender rolls.

10. The base material for pressure-sensitive adhesive tape or sheet according to claim 7, wherein the number of calender rolls is four, and the roll arrangement is in the reverse L shape.

11. The base material for pressure-sensitive adhesive tape or sheet according to claim 7, comprising an inorganic compound together with the polyolefin based resin.

12. A pressure-sensitive adhesive tape or sheet comprising a pressure-sensitive adhesive layer formed on at least one surface of the base material for pressure-sensitive adhesive tape or sheet according to claim 7.

* * * * *